US008259725B2

(12) United States Patent
Sun et al.

(10) Patent No.: US 8,259,725 B2
(45) Date of Patent: Sep. 4, 2012

(54) METHOD, SYSTEM AND DEVICE FOR REMOVING MEDIA ACCESS CONTROL ADDRESSES

(75) Inventors: Guangyu Sun, Shenzhen (CN); Xindong Teng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 291 days.

(21) Appl. No.: 12/693,892

(22) Filed: Jan. 26, 2010

(65) Prior Publication Data

US 2010/0128728 A1    May 27, 2010

Related U.S. Application Data

(63) Continuation of application No. PCT/CN2008/072339, filed on Sep. 11, 2008.

(30) Foreign Application Priority Data

Sep. 12, 2007  (CN) .......................... 2007 1 0145444

(51) Int. Cl.
    H04L 12/56       (2006.01)
(52) U.S. Cl. ................ 370/392; 370/395.3; 370/395.31; 709/220
(58) Field of Classification Search .................. None
    See application file for complete search history.

(56) References Cited

U.S. PATENT DOCUMENTS

| 2003/0142674 | A1  | 7/2003  | Casey |
| 2006/0245435 | A1  | 11/2006 | Sajassi |
| 2008/0225695 | A1* | 9/2008  | Balus et al. ................ 370/216 |
| 2009/0154339 | A1  | 6/2009  | Zi |

FOREIGN PATENT DOCUMENTS

| CN | 1863069    | A  | 11/2006 |
| CN | 1909497    | A  | 2/2007  |
| CN | 101009643  | A  | 8/2007  |
| CN | 100512196  | A  | 1/2008  |
| CN | 101110747  | A  | 1/2008  |
| CN | 100512196  | C  | 7/2009  |
| WO | 2009033428 | A1 | 3/2009  |

OTHER PUBLICATIONS

Lasserre, M. et al. "Virtual Private LAN Service (VPSL) Using Label Distribution Protocol (LDP) Signaling" Network Working Group. Jan. 2007.

(Continued)

*Primary Examiner* — Ayaz Sheikh
*Assistant Examiner* — Nicholas Sloms
(74) *Attorney, Agent, or Firm* — Brinks Hofer Gilson & Lione (57) ABSTRACT

The present invention discloses a method, system and device for removing Media Access Control (MAC) addresses. The method includes: sending, by a first User-facing Provider Edge (UPE), a MAC Address Withdraw message, when a handover happens on an access network; receiving, by a network provider edge (NPE), the MAC Address Withdraw message; and removing, by the NPE, a Backbone Media Access Control (B-MAC) address table corresponding to a Virtual Private LAN Service (VPLS) network and forwarding the MAC Address Withdraw message, if the message carries no specific identifier; or directly forwarding, by the NPE, the MAC Address Withdraw message, if the message carries a specific identifier. In the present invention, a specific identifier is added to a MAC Address Withdraw message so as to avoid unnecessary MAC address learning by NPE and UPE devices and to reduce the impact, caused by MAC address learning, on network devices.

9 Claims, 4 Drawing Sheets

OTHER PUBLICATIONS

Dutta, Pranjal et al. LDP Extensions for Optimized MAC Address Withdrawal in H-VPLS draft-pdutta-l2vpn-ldp-mac-opt-02.txt. Internet Engineering Task Force. Mar. 3, 2007.

"Virtual Bridged Local Area Networks—Amendment 6: Provider Backbone Bridges" The Institute of Electrical and Electronics Engineers, Inc. Nov. 21, 2007.

Witters, Johan et al. "VPLS Technical Tutorial" Alcatel Telecommunications Review. $4^{th}$ Quarter 2004.

Written Opinion of the International Searching Authority issued in corresponding PCT Application No. PCT/CN2008/072339; mailed Dec. 18, 2008.

Supplementary European Search Report issued in corresponding European Patent Application No. 08 80 0849; mailed Aug. 26, 2010.

* cited by examiner

FIG. 1 (PRIOR ART)

| MPLS Header | B-DMAC | B-SMAC | B-TAG | I-TAG | C-DMAC | C-SMAC | S-TAG | C-TAG | User data |

METHOD, SYSTEM AND DEVICE FOR REMOVING MEDIA ACCESS CONTROL ADDRESSES

CROSS-REFERENCE TO RELATED APPLICATIONS

The application is a continuation of International Application No. PCT/CN2008/072339, filed on Sep. 11, 2008, which claims priority to Chinese Patent Application No. 200710145444.4, filed on Sep. 12, 2007, both of which are hereby incorporated by reference in their entireties.

FIELD OF THE INVENTION

The present invention relates to the field of communications, and in particular, to a method, system and device for removing Media Access Control (MAC) addresses.

BACKGROUND OF THE INVENTION

Virtual Private LAN Service (VPLS) is a Layer 2 Virtual Private Network (L2VPN) technology based on Multi-Protocol Label Switching (MPLS) and Ethernet. VPLS enables multipoint-to-multipoint VPN networking. It provides a better solution for operators that use a point-to-point L2VPN and may simplify the management of internal routing information.

In a VPLS network, generally, fully connected pseudo wires (PWs) are required between Provider Edge (PE) devices, but this solution is not good for expansion of the network. Hierarchical VPLS (H-VPLS), unlike VPLS, requires only fully connected PWs between Network Provider Edge (NPE) devices and a User-facing Provider Edge (UPE) device only needs to connect to the NPE. The H-VPLS solution better suits the hierarchical network structure and enables easier deployment of VPLS networks.

The prior art provides an operator backbone Ethernet architecture called Provider Backbone Bridges (PBB), which uses MAC-in-MAC encapsulation to re-encapsulate Ethernet packets in a UPE with the Backbone Media Access Control (B-MAC) address of an Backbone Edge Bridge (BEB) to hide the Customer Media Access Control (C-MAC) address of the user. The NPE only needs to proceed according to the B-MAC address.

The UPE learns the mapping between the B-MAC address and the C-MAC address from data packets of the user. When the UPE receives a packet from the Customer Edge (CE), the UPE finds the corresponding Customer Destination MAC (C-DMAC) address in the MAC address table, finds the corresponding B-MAC address according to the C-DMAC address, and adds the B-MAC address to the Backbone Destination MAC (B-DMAC) address field of the MAC address table. The NPE only needs to learn the B-MAC address of the UPE so that the MAC addresses to be learned by the NPE are fewer and that the H-VPLS system is more scalable. Moreover, when the Customer Premises Network (CPN) changes, the position of the B-MAC address does not change and the NPE does not need to re-learn the MAC address and thus the impact, caused by unnecessary packets, on the network is relieved.

Label Distribution Protocol (LSP) based VPLS defines a MAC Address Withdraw message. In a multi-homing network, when the switchover of the active and standby links takes place, the MAC Address Withdraw message is used to notify the far end to remove the corresponding MAC address.

Figure 1:
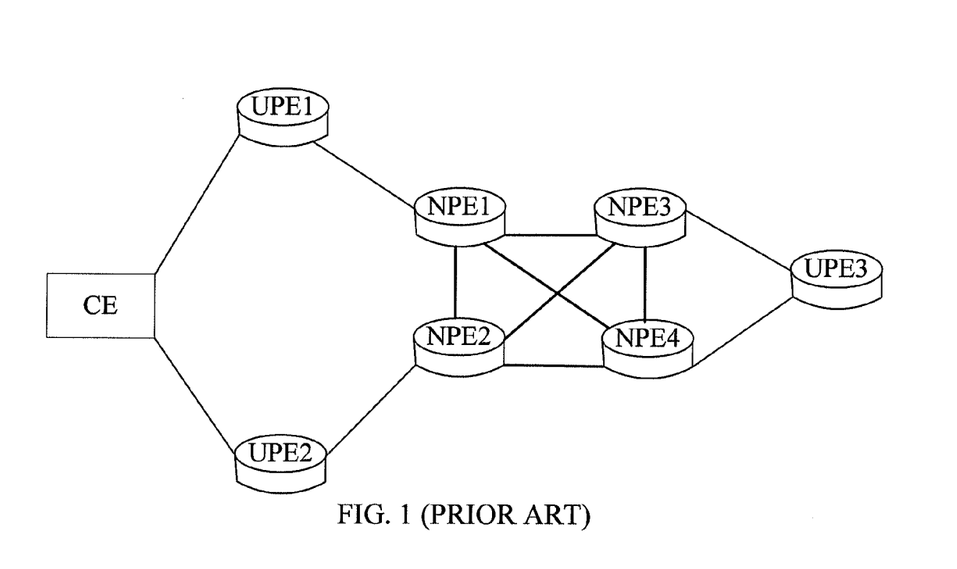
FIG. 1 is a schematic drawing of a PBB VPLS network in the prior art.

As shown in FIG. 1, the CE is dual-homed and connected to both UPE1 and UPE2, where the CE-UPE1 link is an active link and the CE-UPE2 link is a standby link. Then, in the corresponding VPLS, all NPEs learn only the B-MAC address of the UPE while the UPE needs to learn the mapping between the B-MAC address and the C-MAC address. When the CE-UPE1 link fails, the CE-UPE2 link works as the active link instead. In this case, UPE2 may send a MAC Address Withdraw message which carries an empty MAC address table, and the related NPE and UPE devices in the VPLS will remove all MAC addresses. The NPE and UPE devices need to learn MAC addresses again.

In addition, the MAC Address Withdraw method also defines a MAC address table that is able to remove a specified MAC address. However, in the network shown in FIG. 1, because CEs change randomly, it is hard for UPE2 to know all MAC addresses of the CEs. In this case, the only choice is to let the MAC Address Withdraw message carry an empty MAC address table. Devices receiving the MAC Address Withdraw message will remove all MAC addresses of the corresponding Virtual Switch Instance (VSI). The NPE and UPE devices must learn MAC addresses again. The VSI is configured to map physical access links of the VPLS to virtual links.

During implementation of the present invention, the inventor finds that large numbers of unicast packets exist in the process of MAC address learning by the NPE and UPE, and impact the network.

SUMMARY OF THE INVENTION

For the purpose of reasonably removing MAC addresses and reducing the impact, caused by MAC address learning, on network devices, embodiments of the present invention provide a method, system and device for removing MAC addresses. The technical solution is as follows:

A method for removing MAC addresses includes:

sending, by a first User-facing Provider Edge (UPE), a MAC Address Withdraw message, when a handover happens on an access network;

receiving, by a network provider edge (NPE), the MAC Address Withdraw message; and removing, by the NPE, a Backbone Media Access Control (B-MAC) address table corresponding to a Virtual Private LAN Service (VPLS) network and forwarding the MAC Address Withdraw message if the message carries no specific identifier, or directly forwarding the MAC Address Withdraw message if the message carries a specific identifier.

A system for removing MAC addresses includes:

a network provider edge (NPE), configured to: receive a MAC Address Withdraw message from a first User-facing Provider Edge (UPE) when a handover happens on an access network, and remove a B-MAC address table corresponding to a VPLS network and forward the message if the message carries no specific identifier, or directly forward the message if the message carries a specific identifier; and a second UPE, configured to: upon reception of the message forwarded by the NPE, remove the B-MAC address table corresponding to the VPLS network if the message carries no specific identifier, or remove a B-MAC address entry corresponding to the specific identifier in a C-MAC address table if the message carries a specific identifier.

Further, an NPE includes:

a message receiving module, configured to receive a MAC Address Withdraw message from a first User-facing Provider Edge (UPE) when a handover happens on an access network; and a message processing module, configured to: remove a B-MAC address table corresponding to a VPLS network, and forward the message if the message received by the message receiving module carries no specific identifier, or forward the message if the message carries a specific identifier;

where the specific identifier is one of a user identifier of a Customer Edge (CE), an interface identifier of the UPE and a general identifier of all B-MAC addresses.

A UPE includes:

a message receiving module, configured to receive a MAC Address Withdraw message;

a first address removing module, configured to remove a B-MAC address table corresponding to a VPLS network, if the message received by the message receiving module carries no specific identifier;

a second address removing module, configured to remove a B-MAC address entry corresponding to the user identifier in a C-MAC address table, if the message received by the message receiving module carries a user identifier;

a third address removing module, configured to remove a group of B-MAC address entries corresponding to the interface identifier in the C-MAC address table, if the message received by the message receiving module carries an interface identifier; and a fourth address removing module, configured to remove B-MAC address entries corresponding to the general identifier in the C-MAC address table, if the message received by the message receiving module carries a general identifier.

The technical solution provides the following benefits:

Because a specific identifier is added to the MAC Address Withdraw message, the NPE will not perform unnecessary removal of MAC addresses, which improves the removal of MAC addresses, avoids unnecessary MAC address learning by the NPE, and reduces the impact, caused by MAC address learning, on network devices.

DETAILED DESCRIPTION OF THE EMBODIMENTS

To make the technical solution, objectives and merits of the present invention clearer, the following describes the embodiments of the present invention in detail with reference to accompanying drawings.

In the embodiments of the present invention, a specific identifier is added to the MAC Address Withdraw message so that the NPE is able to decide whether to remove MAC addresses according to the information in the message and that the UPE is able to remove the corresponding MAC address. This improves the removal of MAC addresses and avoids unnecessary MAC address learning by the NPE and UPE and thus reduces the impact, caused by MAC address learning, on network devices.

Embodiment 1

The first embodiment of the present invention provides a method for removing MAC addresses, including the following steps:

1. The NPE receives a MAC Address Withdraw message; if the message carries no specific identifier, the NPE removes the B-MAC address table corresponding to the VPLS and forwards the message; if the message carries a specific identifier, the NPE directly forwards the message.

2. Upon reception of the message, the UPE removes the B-MAC address table corresponding to the VPLS if the message carries no specific identifier, and removes the B-MAC address entry corresponding to the specific identifier in the C-MAC address table if the message carries a specific identifier.

To implement the method, a UPE should assign user identifiers to CEs connected with the UPE, one user identifier to one CE. If one CE is connected with two UPEs, the two UPEs assign a same user identifier to the CE. The UPE learns MAC addresses from data packets sent by users. In this embodiment, when a UPE receives a data packet from a user, the UPE adds MPLS Header, B-DMAC, Backbone Source MAC (B-SMAC), Backbone tag (B-TAG) and Instance tag (I-TAG) to the data packet.

Figure 2:
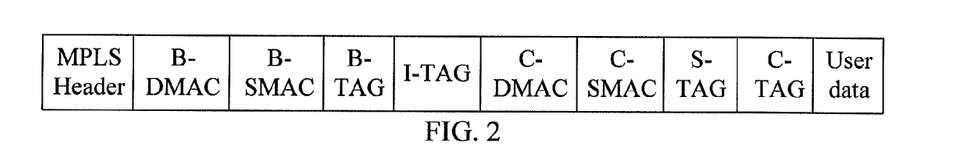
FIG. 2 shows a packet encapsulation format according to a first embodiment of the present invention.

The encapsulation format of the packet after the above fields are added is shown in FIG. 2. The MPLS Header identifies a VPLS, indicating which VPLS the packet is from.

The B-TAG and/or I-TAG identifies the accessed user. It is a user identification field which can carry a specific identifier, such as the user identifier of a CE, or the interface identifier of a UPE that specifies a CE group under the interface, or other special characters serving as a general identifier of all B-MAC addresses and used to identify all CEs connected with the UPE.

The B-DMAC indicates the destination B-MAC address of the packet.

The B-SMAC represents the source B-MAC address of the packet, which is the MAC address of the UPE.

With respect to packets from the network, when the UPE learns C-MAC addresses, the UPE needs to record the B-MAC address and user identifier corresponding to each C-MAC address.

After the learning of MAC addresses is complete, there are two MAC address tables in the UPE, a B-MAC address table and a C-MAC address table, and one B-MAC address table in the NPE. The B-MAC address table records the mapping between B-MAC addresses and egresses; the C-MAC address table records the mapping among C-MAC addresses, B-MAC addresses and the specific identifiers of the corresponding users. In later forwarding, in the case of a known destination C-MAC address, packets are forwarded from the egress corresponding to the B-MAC address table.

Figure 3:
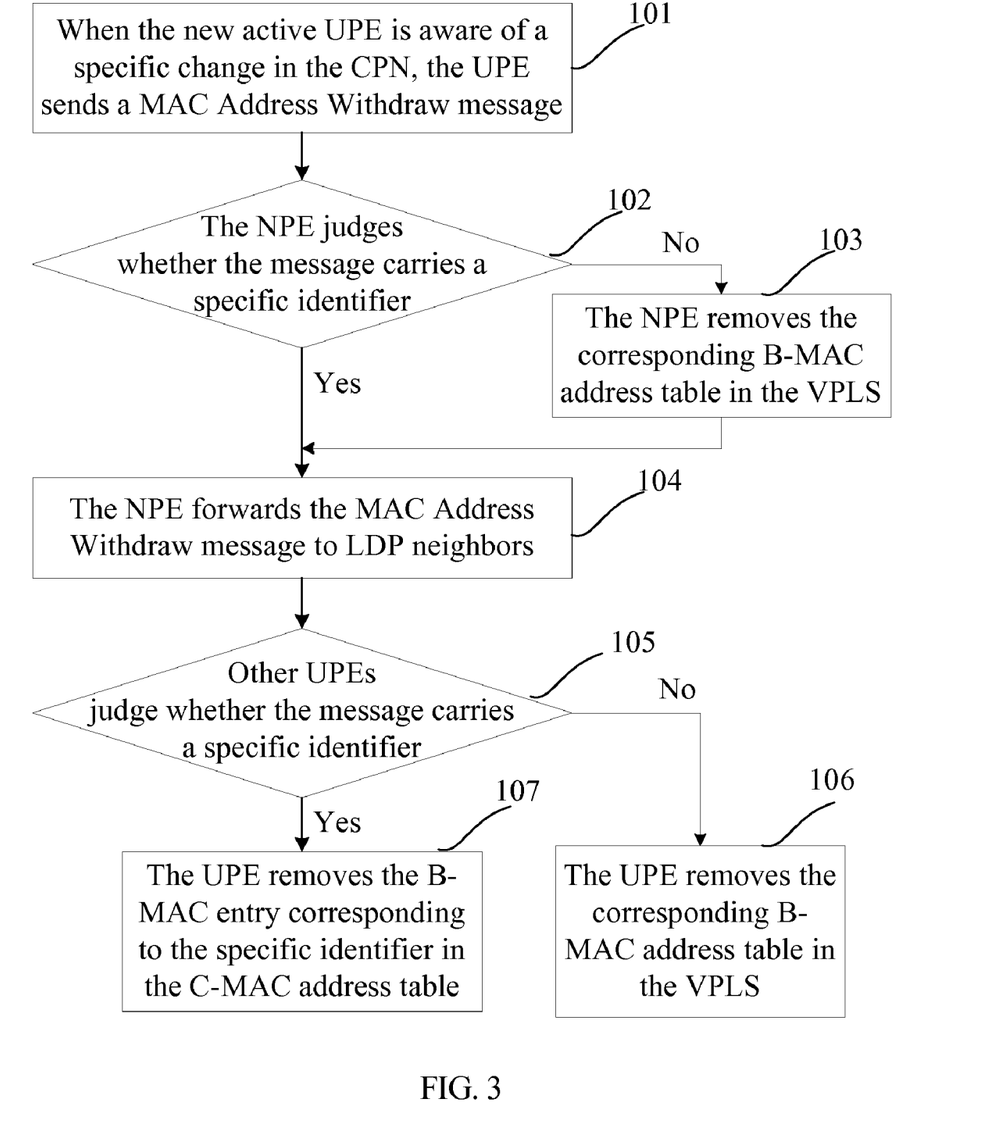
FIG. 3 shows a flowchart of a method for removing MAC addresses according to the first embodiment of the present invention.

As shown in FIG. 3, the method for removing MAC addresses according to an embodiment of the present invention includes:

Step 101: When the new active UPE is aware of a specific change in the CPN, the UPE sends a MAC Address Withdraw message.

When handover happens on the access network due to a change in the access network topology or provider network, the new active UPE will notify other devices to remove corresponding MAC addresses. In this embodiment, the LDP MAC Address Withdraw message is sent to notify other devices to remove corresponding MAC addresses by placing the appropriate specific identifier in the message as an additional attribute. In the case of a backbone network failure, the LDP MAC Address Withdraw message does not carry a user identifier.

Step 102: Upon reception of the MAC Address Withdraw message, the NPE judges whether the message carries a specific identifier. If the message carries no specific identifier, the process proceeds to step 103; otherwise, the process proceeds to step 104.

Step 103: The NPE removes the corresponding B-MAC address table in the VPLS, and then the process proceeds to step 104.

Step 104: The NPE forwards the MAC Address Withdraw message to LDP neighbors.

Step 105: Upon reception of the MAC Address Withdraw message, other UPEs judge whether the message carries a specific identifier. If the message carries no specific identifier, the process proceeds to step 106; otherwise, the process proceeds to step 107.

Step 106: The UPE removes the corresponding B-MAC address table in the VPLS.

Step 107: The UPE removes the B-MAC address entry corresponding to the specific identifier in the C-MAC address table.

Figure 4:
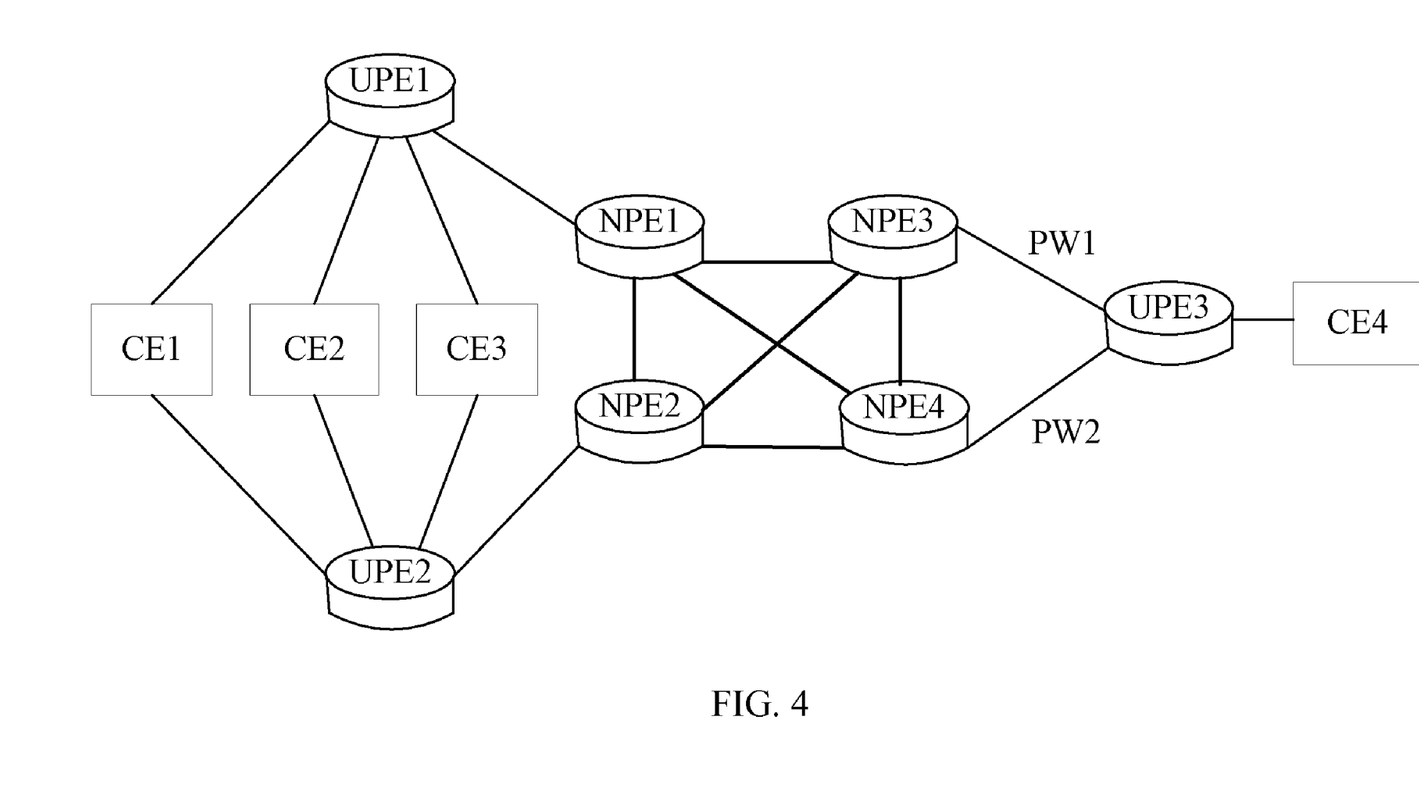
FIG. 4 is a schematic drawing of a PBB VPLS network according to the first embodiment of the present invention.

Taking the PBB VPLS network shown in FIG. 4 as an example, CE1, CE2, CE3, and CE4 belong to one VPLS instance, where CE1, CE2 and CE3 are respectively dual-homed to UPE1 and UPE2, and CE4 is connected with UPE3. UPE1 and UPE2 are connected to NPE1 and NPE2 respectively via PW branches. Fully connected PWs are set up between NPE1, NPE2, NPE3, and NPE4. UPE1 and UPE2 configure user identifiers C1, C2 and C3 respectively for CE1, CE2 and CE3. CE1 and CE2 choose UPE1 as the active device and CE3 chooses UPE2 as the active device. CE1 is connected with two users, whose C-MAC addresses are MAC1 and MAC2. CE2 is connected with one user, whose C-MAC address is MAC3. CE3 is connected with one user whose C-MAC address is MAC4. The C-MAC address table learned by UPE3 is shown in Table 1 and the learned B-MAC address table is shown in Table 2.

TABLE 1

| C-MAC | B-MAC | Specific Identifier |
|---|---|---|
| MAC1 | $MAC_{UPE-1}$ | C1 |
| MAC2 | $MAC_{UPE-1}$ | C1 |
| MAC3 | $MAC_{UPE-1}$ | C2 |
| MAC4 | $MAC_{UPE-2}$ | C3 |

TABLE 2

| B-MAC | Egress |
|---|---|
| $MAC_{UPE-1}$ | PW1 |
| $MAC_{UPE-2}$ | PW2 |

Suppose the link between CE1 and UPE1 fails and packets from CE1 are switched to the link with UPE2. In this case, UPE2 sends a MAC Address Withdraw message. Specifically, a user identifier field is added to the MAC Address Withdraw message to carry the user identifier C1 of CE1.

After receiving the MAC Address Withdraw message, because the message carries the user identifier C1, NPE2 only forwards the MAC Address Withdraw message to LDP neighbors without removing local B-MAC addresses.

Upon reception of the MAC Address Withdraw message that carries the user identifier, UPE3 removes the entry corresponding to the user identifier (C1) in the C-MAC address table. The C-MAC address table after the removal is shown in Table 3.

TABLE 3

| C-MAC | B-MAC | Specific Identifier |
|---|---|---|
| MAC3 | $MAC_{UPE-1}$ | C2 |
| MAC4 | $MAC_{UPE-2}$ | C3 |

When removing the entry corresponding to C1, UPE3 may remove only the corresponding B-MAC entry instead of the entire record.

The user identifier may not refer to a specific user but refer to a user group, such as all Virtual Switch Instance (VSI) sites on a link or all CEs in a VPLS. The UPE removes corresponding entries according to the specific identifier carried in the MAC Address Withdraw message.

Optionally, the MAC Address Withdraw message may further carry the original B-MAC and substitute B-MAC fields in addition to the user identifier. The UPE receiving such a message finds the corresponding entry according to the user identifier, removes the original B-MAC address in the entry, and adds the substitute B-MAC address. Taking Table 1 as an example: When the message received by UPE3 carries the user identifier C1, $MAC_{UPE-1}$ and $MAC_{UPE-2}$, UPE3 replaces the $MAC_{UPE-1}$ in the entry corresponding to C1 with $MAC_{UPE-2}$. The C-MAC address table after the replacement is shown in Table 4.

TABLE 4

| C-MAC | B-MAC | Specific Identifier |
|---|---|---|
| MAC1 | $MAC_{UPE-2}$ | C1 |
| MAC2 | $MAC_{UPE-2}$ | C1 |
| MAC3 | $MAC_{UPE-1}$ | C2 |
| MAC4 | $MAC_{UPE-2}$ | C3 |

In the case of a change in the topology of the provider network, the NPE triggers a MAC Address Withdraw message which carries no user identifier. Upon reception of the MAC Address Withdraw message, other NPEs remove their B-MAC address tables. But the UPE removes only the B-MAC address table without removing the mapping between C-MAC addresses and B-MAC addresses in the C-MAC address table.

In this embodiment, because a specific identifier is added to the MAC Address Withdraw message, the range of the impact of a change in the network topology is smaller. In the event of a change in a CPN, the NPE is not impacted and the UPE only removes corresponding MAC addresses with respect to the particular user change so that other MAC addresses learned are retained. This avoids the relearning of the unrelated MAC address entries and therefore saves network bandwidths and relieves the impact on network devices. In addition, a substitute B-MAC address may be carried in the message. In this case, unrelated entries are not impacted and affected entries do not need to be removed entirely and instead, the original B-MAC address is changed to the substitute B-MAC address. Thus, the impact, caused by a network topology change, on network devices is further relieved.

Embodiment 2

Figure 5:
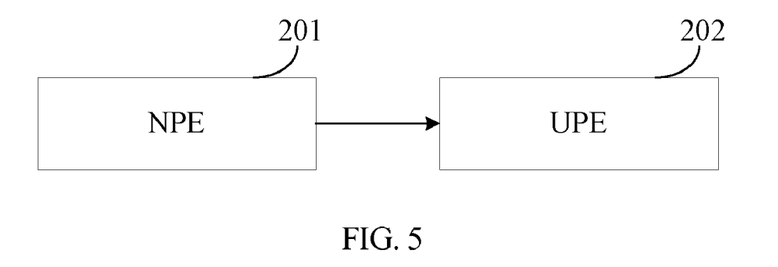
FIG. 5 is a schematic drawing of a system for removing MAC addresses according to a second embodiment of the present invention.

As shown in FIG. 5, the second embodiment of the present invention provides a system for removing MAC addresses, including:

a NPE (201), configured to: receive a MAC Address Withdraw message, and remove the B-MAC address table corresponding to the VPLS network and forward the message if the message carries no specific identifier, or directly forward the message if the message carries a specific identifier; and a UPE (202), configured to: upon reception of the message forwarded by the NPE 201, remove the B-MAC address table corresponding to the VPLS network if the message carries no specific identifier, or remove the B-MAC address entry corresponding to the specific identifier in the C-MAC address table if the message carries a specific identifier.

The specific identifier is the identifier of a CE; or
an interface identifier of the UPE 202; or
a general identifier of all B-MAC addresses.

The UPE 202 includes:

a message receiving module, configured to receive the message forwarded by the NPE 201;

a first address removing module, configured to remove a B-MAC address table corresponding to the VPLS network, if the message received by the message receiving module does not carry any specific identifier;

a second address removing module, configured to remove a B-MAC address entry corresponding to the user identifier in the C-MAC address table, if the message received by the message receiving module carries a user identifier;

a third address removing module, configured to remove a group of B-MAC address entries corresponding to the interface identifier in the C-MAC address table, if the message received by the message receiving module carries an interface identifier; and a fourth address removing module, configured to remove B-MAC address entries corresponding to the general identifier in the C-MAC address table, if the message received by the message receiving module carries a general identifier.

The UPE 202 further includes:

a substitute address adding module, configured to: remove the B-MAC address entry corresponding to the user identifier in the C-MAC address table, and add the substitute address for the B-MAC address, if the message received by the message receiving module carries a user identifier and a substitute address for a B-MAC address.

In this embodiment, a specific identifier is added to the MAC Address Withdraw message so that the NPE is able to decide whether to remove MAC addresses according to the information in the message and that the UPE is able to remove corresponding MAC addresses. This improves the removal of MAC addresses and avoids unnecessary MAC address learning by the NPE and UPE and thus reduces the impact on network devices owing to MAC address learning.

Embodiment 3

Figure 6:
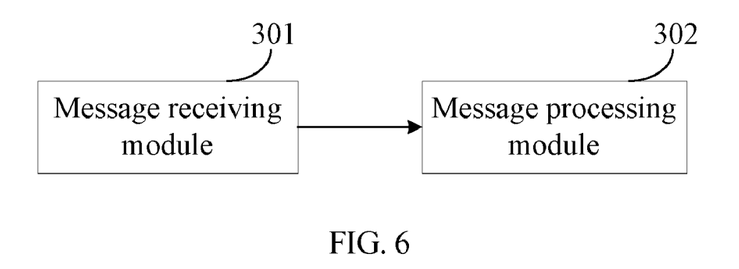
FIG. 6 is a schematic drawing of an NPE provided according to a third embodiment of the present invention.

As shown in FIG. 6, the third embodiment of the present invention provides an NPE, which may serve as the NPE in the system provided in the second embodiment of the present invention. The NPE includes:

a message receiving module 301, configured to receive a MAC Address Withdraw message; and a message processing module 302, configured to: remove a B-MAC address table corresponding to the VPLS network and forward the message if the message received by the message receiving module 301 does not carry any specific identifier, or directly forward the message if the message carries a specific identifier.

In this embodiment, the NPE decides whether to remove MAC addresses according to whether a specific identifier is carried in the MAC Address Withdraw message. This improves the removal of MAC addresses, avoids unnecessary MAC address learning by the NPE and reduces the impact, caused by MAC address learning, on the NPE.

Embodiment 4

Figure 7:
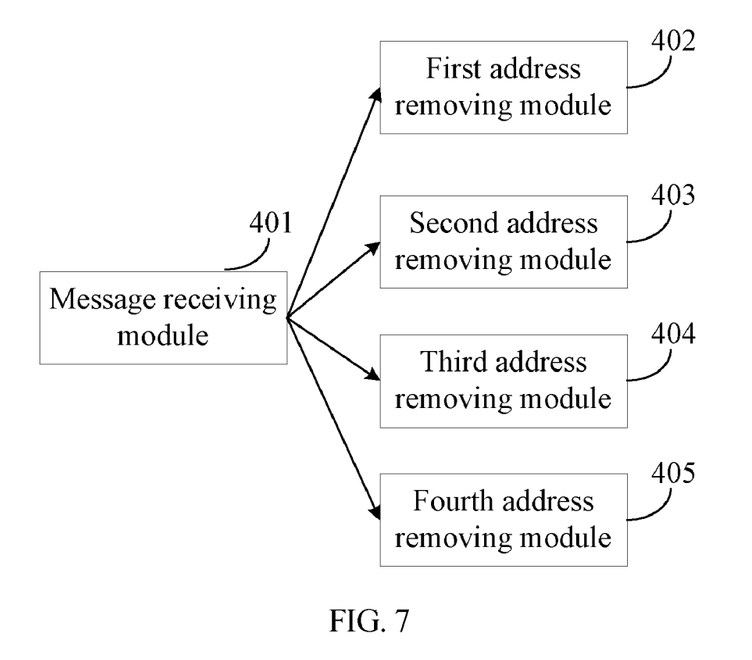
FIG. 7 is a schematic drawing of a UPE provided according to a fourth embodiment of the present invention.

As shown in FIG. 7, the fourth embodiment of the present invention provides a UPE, which may serve as the UPE in the system provided in the second embodiment of the present invention. The UPE includes:

a message receiving module 401, configured to receive a MAC Address Withdraw message;

a first address removing module 402, configured to remove the B-MAC address table corresponding to the VPLS network, if the message received by the message receiving module 401 does not carry any specific identifier;

a second address removing module 403, configured to remove a B-MAC address entry corresponding to the user identifier in the C-MAC address table, if the message received by the message receiving module 401 carries a user identifier;

a third address removing module 404, configured to remove a group of B-MAC address entries corresponding to the interface identifier in the C-MAC address table, if the message received by the message receiving module 401 carries an interface identifier; and a fourth address removing module 405, configured to remove B-MAC address entries corresponding to the general identifier in the C-MAC address table, if the message received by the message receiving module 401 carries a general identifier.

The UPE further includes:

a substitute address adding module, configured to: remove a B-MAC address entry corresponding to the user identifier in the C-MAC address table and add the substitute address for the B-MAC address, if the message received by the message receiving module 401 carries a user identifier and a substitute address for a B-MAC address.

In this embodiment, the UPE removes appropriate MAC addresses according to whether a specific identifier is carried in the MAC Address Withdraw message and the type of the specific identifier. This improves the removal of MAC addresses, avoids unnecessary MAC address learning by the UPE and reduces the impact, caused by MAC address learning, on the UPE. In addition, if the message carries a substitute B-MAC address, the original B-MAC address can be directly changed to the substitute B-MAC address, which further reduces the impact, caused by network topology changes, on the UPE.

All or part of the steps in the embodiments of the present invention may be implemented by hardware under control of software instructions, which may be stored in a readable storage medium such as a computer hard disk or a memory.

Although the invention has been described through several exemplary embodiments, the invention is not limited to such embodiments. It is apparent that those skilled in the art can make various modifications and variations to the invention without departing from the spirit and scope of the present invention. The invention is intended to cover the modifications and variations provided that they fall in the scope of protection defined by the following claims or their equivalents.

What is claimed is:

1. A method for removing Media Access Control (MAC) addresses, comprising:
sending, by a first User-facing Provider Edge (UPE), a MAC Address Withdraw message, when a handover happens on an access network;
receiving, by a network provider edge (NPE), the MAC Address Withdraw message; and
removing, by the NPE, a Backbone Media Access Control (B-MAC) address table corresponding to a Virtual Private LAN Service (VPLS) network and forwarding the MAC Address Withdraw message if the message carries no specific identifier, or directly forwarding the MAC Address Withdraw message if the message carries a specific identifier,
wherein the UPE is configured to add a substitute address for a B-MAC address to a B-MAC address entry corresponding to a user identifier when the MAC Address Withdraw message carries the user identifier and the substitute address for the B-MAC address,
wherein the UPE is further configured to receive the message forwarded by the NPE router;
remove the B-MAC address table corresponding to the VPLS network, if the message received carries no specific identifier;
remove a B-MAC address entry corresponding to the user identifier in the C-MAC address table, if the message received carries a user identifier;
remove a group of B-MAC address entries corresponding to the interface identifier in the C-MAC address table, if the message received carries an interface identifier; and
remove B-MAC address entries corresponding to the general identifier in the C-MAC address table, if the message received by the message receiving module carries a general identifier.

2. The method of claim 1, further comprising:
by a second User-facing Provider Edge (UPE), upon reception of the message forwarded by the NPE, removing a B-MAC address table corresponding to the VPLS network if the message carries no specific identifier; or removing a B-MAC address entry corresponding to the specific identifier in a Customer Media Access Control (C-MAC) address table, if the message carries a specific identifier.

3. The method of claim 1, wherein the specific identifier is one of:
a user identifier of a Customer Edge (CE);
an interface identifier of the UPE; and
a general identifier of all B-MAC addresses.

4. The method of claim 2, further comprising:
adding the substitute address for the B-MAC address to the B-MAC address entry corresponding to the user identifier after removing the B-MAC address entry corresponding to the user identifier in the C-MAC address table.

5. A system for removing Media Access Control (MAC) addresses, comprising:
a network provider edge (NPE) router, configured to: receive a MAC Address Withdraw message from a first User-facing Provider Edge (UPE) when a handover happens on an access network, and remove a Backbone Media Access Control (B-MAC) address table corresponding to a Virtual Private LAN Service (VPLS) network and forward the message if the message carries no specific identifier, or directly forward the message if the message carries a specific identifier; and
a second User-facing Provider Edge (UPE), configured to: upon reception of the message forwarded by the NPE router, remove a B-MAC address table corresponding to the VPLS network if the message carries no specific identifier, or remove a B-MAC address entry corresponding to the specific identifier in a Customer Media Access Control (C-MAC) address table if the message carries a specific identifier,
wherein the UPE is configured to add a substitute address for a B-MAC address to a B-MAC address entry corresponding to a user identifier when the MAC Address Withdraw message carries the user identifier and the substitute address for the B-MAC address,
wherein the UPE comprises:
a message receiving module, configured to receive the message forwarded by the NPE router;
a first address removing module, configured to remove the B-MAC address table corresponding to the VPLS network, if the message received by the message receiving module carries no specific identifier;
a second address removing module, configured to remove a B-MAC address entry corresponding to the user identifier in the C-MAC address table, if the message received by the message receiving module carries a user identifier;
a third address removing module, configured to remove a group of B-MAC address entries corresponding to the interface identifier in the C-MAC address table, if the message received by the message receiving module carries an interface identifier; and
a fourth address removing module, configured to remove B-MAC address entries corresponding to the general identifier in the C-MAC address table, if the message received by the message receiving module carries a general identifier.

6. The system of claim 5, wherein the specific identifier is one of:
a user identifier of a Customer Edge (CE);
an interface identifier of the UPE; and
a general identifier of all B-MAC addresses.

7. A Network Provider Edge (NPE) router, comprising:
a message receiving module, configured to receive a MAC Address Withdraw message from a first User-facing Provider Edge (UPE) when a handover happens on an access network; and
a message processing module, configured to: remove a Backbone Media Access Control (B-MAC) address table corresponding to a Virtual Private LAN Service (VPLS) network and forward the message if the message received by the message receiving module carries no specific identifier, or directly forward the message if the message carries a specific identifier;
wherein the specific identifier is one of a user identifier of a Customer Edge (CE), an interface identifier of the UPE or a general identifier of all B-MAC addresses,
wherein the UPE is configured to add a substitute address for a B-MAC address to a B-MAC address entry corresponding to a user identifier when the MAC Address Withdraw message carries the user identifier and the substitute address for the B-MAC address,
wherein the UPE is further configured to receive the message forwarded by the NPE router;

remove the B-MAC address table corresponding to the VPLS network, if the message received carries no specific identifier;

remove a B-MAC address entry corresponding to the user identifier in the C-MAC address table, if the message received carries a user identifier;

remove a group of B-MAC address entries corresponding to the interface identifier in the C-MAC address table, if the message received carries an interface identifier; and remove B-MAC address entries corresponding to the general identifier in the C-MAC address table, if the message received by the message receiving module carries a general identifier.

8. A User-facing Provider Edge (UPE), comprising a processor, wherein the processor comprises:

a message receiving module, configured to receive a MAC Address Withdraw message;

a first address removing module, configured to remove a Backbone Media Access Control (B-MAC) address table corresponding to a Virtual Private LAN Service (VPLS) network, if the message received by the message receiving module carries no specific identifier;

a second address removing module, configured to remove a B-MAC address entry corresponding to the user identifier in a Customer Media Access Control (C-MAC) address table, if the message received by the message receiving module carries a user identifier;

a third address removing module, configured to remove a group of B-MAC address entries corresponding to the interface identifier in the C-MAC address table, if the message received by the message receiving module carries an interface identifier; and a fourth address removing module, configured to remove B-MAC address entries corresponding to the general identifier in the C-MAC address table, if the message received by the message receiving module carries a general identifier.

9. The UPE of claim 8, further comprising:

a substitute address adding module, configured to add the substitute address for the B-MAC address to the B-MAC address entry corresponding to the user identifier, if the message received by the message receiving module (401) carries a user identifier and a substitute address for a B-MAC address.

\* \* \* \* \*

UNITED STATES PATENT AND TRADEMARK OFFICE
CERTIFICATE OF CORRECTION

| | | |
|---|---|---|
| PATENT NO. | : 8,259,725 B2 | |
| APPLICATION NO. | : 12/693892 | |
| DATED | : September 4, 2012 | |
| INVENTOR(S) | : Guangyu Sun et al. | |

It is certified that error appears in the above-identified patent and that said Letters Patent is hereby corrected as shown below:

In the Claims

In Column 12, claim 9, line 19, before "carries a user identifier" delete "(401)".

Signed and Sealed this
Twentieth Day of November, 2012

David J. Kappos
*Director of the United States Patent and Trademark Office*